(12) United States Patent
Iwasaki et al.

(10) Patent No.: US 12,738,017 B2
(45) Date of Patent: Sep. 15, 2026

(54) INFORMATION PROCESSING APPARATUS, METHOD, PROGRAM, AND IMAGING APPARATUS

(71) Applicant: FUJIFILM Corporation, Tokyo (JP)

(72) Inventors: Tatsuro Iwasaki, Saitama (JP); Yasunobu Kishine, Saitama (JP); Kazuyoshi Okada, Saitama (JP); Takashi Kunugise, Saitama (JP); Koichi Tanaka, Saitama (JP); Yuya Hirakawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 169 days.

(21) Appl. No.: 18/617,638

(22) Filed: Mar. 26, 2024

(65) Prior Publication Data

US 2024/0242468 A1 Jul. 18, 2024

Related U.S. Application Data

(63) Continuation of application No. PCT/JP2022/031321, filed on Aug. 19, 2022.

(30) Foreign Application Priority Data

Sep. 30, 2021 (JP) ................................ 2021-162372

(51) Int. Cl.
*G06V 10/143* (2022.01)
*G06T 7/11* (2017.01)
(Continued)

(52) U.S. Cl.
CPC ................ *G06V 10/44* (2022.01); *G06T 7/11* (2017.01); *G06V 10/143* (2022.01);
(Continued)

(58) Field of Classification Search
CPC ......... G06V 10/143; G09G 2320/0209; H04N 23/675
See application file for complete search history.

(56) References Cited

U.S. PATENT DOCUMENTS 5,509,086 A * 4/1996 Edgar ...................... H04N 1/58 382/167
6,980,248 B1 * 12/2005 Suda .................... H04N 25/136 348/42

(Continued)

FOREIGN PATENT DOCUMENTS

JP 2011014966 1/2011
WO 2007119430 10/2007

(Continued)

OTHER PUBLICATIONS

"International Search Report (Form PCT/ISA/210) of PCT/JP2022/031321", mailed on Nov. 1, 2022, with English translation thereof, pp. 1-5.

(Continued)

*Primary Examiner* — Yuzhen Shen
(74) *Attorney, Agent, or Firm* — JCIPRNET

(57) ABSTRACT

The present disclosure relates to detection of crosstalk included in images output from an image sensor. An information processing apparatus includes a processor configured to process images output from an image sensor of an imaging apparatus that captures images having different characteristics by splitting a pupil. The processor is configured to acquire a first image that is captured by the imaging apparatus under a first imaging condition and that is output from the image sensor, acquire a second image that is captured by the imaging apparatus under a second imaging condition different from the first imaging condition and that has the same characteristic as the first image among the images output from the image sensor, and detect crosstalk (Continued)

included in the images based on a correlation between feature amounts of the first image and the second image.

20 Claims, 13 Drawing Sheets

(51) Int. Cl.

| | |
|---|---|
| ***G06V 10/44*** | (2022.01) |
| ***G06V 10/74*** | (2022.01) |
| ***G09G 5/377*** | (2006.01) |
| ***H04N 23/67*** | (2023.01) |

(52) U.S. Cl.

CPC .......... *G06V 10/761* (2022.01); *G09G 5/377* (2013.01); *H04N 23/675* (2023.01); *G09G 2320/0209* (2013.01)

(56) References Cited

U.S. PATENT DOCUMENTS

| | | | | |
|---|---|---|---|---|
| 11,122,242 | B2 | 9/2021 | Ono | |
| 2009/0016632 | A1 | 1/2009 | Yano | |
| 2011/0134288 | A1 | 6/2011 | Kasai | |
| 2015/0009370 | A1 | 1/2015 | Kasai | |
| 2015/0234148 | A1* | 8/2015 | Kusaka | G02B 7/34 348/349 |
| 2017/0230595 | A1 | 8/2017 | Ono | |
| 2018/0158195 | A1 | 6/2018 | Ono | |
| 2019/0377267 | A1* | 12/2019 | Oemrawsingh | G03F 7/7015 |
| 2022/0385863 | A1 | 12/2022 | Kishine et al. | |

FOREIGN PATENT DOCUMENTS

| | | |
|---|---|---|
| WO | 2016080154 | 5/2016 |
| WO | 2017029827 | 2/2017 |
| WO | 2020075523 | 4/2020 |
| WO | 2021172284 | 9/2021 |

OTHER PUBLICATIONS

"Written Opinion of the International Searching Authority (Form PCT/ISA/237) of PCT/JP2022/031321", mailed on Nov. 1, 2022, with English translation thereof, pp. 1-6.

"Notice of Reasons for Refusal of Japan Counterpart Application", issued on Apr. 24, 2026, with English translation thereof, p. 1-p. 4.

* cited by examiner

IMAGE WITH MULTIPLE IMAGES

MULTIPLE IMAGE INTENSITY

HIGH

LOW

MULTIPLE IMAGE MAP

SUPERIMPOSED IMAGE

INFORMATION PROCESSING APPARATUS, METHOD, PROGRAM, AND IMAGING APPARATUS

CROSS-REFERENCE TO RELATED APPLICATIONS

The present application is a Continuation of PCT International Application No. PCT/JP2022/031321 filed on Aug. 19, 2022 claiming priority under 35 U.S.C § 119(a) to Japanese Patent Application No. 2021-162372 filed on Sep. 30, 2021. Each of the above applications is hereby expressly incorporated by reference, in its entirety, into the present application.

BACKGROUND OF THE INVENTION

1. Field of the Invention

The present invention relates to an information processing apparatus, a method, a program, and an imaging apparatus, and particularly to a technology for processing images output from an image sensor of an imaging apparatus that captures images by splitting a pupil.

2. Description of the Related Art

In the related art, an imaging apparatus that can acquire a high-quality multispectral image via one image sensor by splitting a pupil has been suggested (WO2020/075523A).

The imaging apparatus according to WO2020/075523A comprises n types ($n \geq 2$) of spectral filter elements having different spectroscopic transmittances, an image sensor comprising a plurality of pixel blocks that are combined with m types ($2 \leq m \leq 3$) of polarizing filter elements having different azimuths of polarized light transmission to receive q types ($q = n \times m$) of light in each pixel, an optical system comprising k ($k \leq q$) optical regions having different transmitted wavelength ranges of light and comprising a polarizing filter part in each optical region, and a signal processing part that processes a signal value of each pixel obtained from the image sensor to generate an image of each optical region of the optical system. The signal processing part generates the image of each optical region by performing predetermined operation processing with respect to signal values (x1, x2, . . . , xq) of q pixels obtained from each pixel block of the image sensor to calculate signal values (X1, X2, . . . , Xk) of k pixels corresponding to each optical region of the optical system.

In the predetermined operation processing, a coefficient group composed of a matrix of k rows and q columns in which each element is denoted by aij is acquired, and the signal values X1, X2, . . . , Xk of the k pixels corresponding to each optical region of the optical system are calculated from the signal values x1, x2, . . . , xq of the q pixels obtained from each pixel block of the image sensor using [Expression 1] below.

$$\begin{bmatrix} X1 \\ X2 \\ \vdots \\ Xk \end{bmatrix} = \begin{bmatrix} a11 & a12 & \dots & a1q \\ a21 & a22 & \dots & a2q \\ \vdots & \vdots & \vdots & \vdots \\ ak1 & ak2 & \dots & akq \end{bmatrix} * \begin{bmatrix} x1 \\ x2 \\ \vdots \\ xq \end{bmatrix} \quad \text{[Expression 1]}$$

The coefficient group represented by the matrix of k rows and q columns is acquired by calculating an inverse matrix of a matrix having a ratio at which light incident on each optical region of the optical system is received in each pixel of each pixel block of the image sensor as an element. An interference component included in the signal values of the q pixels is removed by performing an operation using the matrix of k rows and q columns and the signal values (x1, x2, . . . , xq) of the q pixels obtained from each pixel block of the image sensor, as illustrated in [Expression 1]. Accordingly, crosstalk between images of wavelength ranges corresponding to each optical region is reduced.

SUMMARY OF THE INVENTION

One embodiment according to the disclosed technology provides an information processing apparatus, a method, a program, and an imaging apparatus that detect crosstalk included in images output from an image sensor of an imaging apparatus which captures images having different characteristics by splitting a pupil.

An invention according to a first aspect is an information processing apparatus comprising a processor configured to process images output from an image sensor of an imaging apparatus that captures images having different characteristics by splitting a pupil, in which the processor is configured to acquire a first image that is captured by the imaging apparatus with respect to a first subject under a first imaging condition and that is output from the image sensor, acquire a second image that is captured by the imaging apparatus with respect to the first subject under a second imaging condition different from the first imaging condition and that has the same characteristic as the first image among the images output from the image sensor, and detect crosstalk included in the images based on a correlation between feature amounts of the first image and the second image.

In the information processing apparatus according to a second aspect of the present invention, it is preferable that the second imaging condition is an imaging condition for changing the feature amounts in a case where the crosstalk occurs.

In the information processing apparatus according to a third aspect of the present invention, it is preferable that the second imaging condition is an imaging condition in which at least one of a focus position, an imaging magnification, an illumination condition for a subject, or a relative position between the subject and the imaging apparatus is different with respect to the first imaging condition.

In the information processing apparatus according to a fourth aspect of the present invention, it is preferable that the processor i configured to acquire a plurality of the first images of different wavelengths that are captured by the imaging apparatus under the first imaging condition and that are output from the image sensor, acquire a plurality of the second images of the different wavelengths that are captured by the imaging apparatus under the second imaging condition and that are output from the image sensor, and detect the crosstalk included in the images based on a correlation between the plurality of first images and the plurality of second images.

In the information processing apparatus according to a fifth aspect of the present invention, it is preferable that the crosstalk is image components of the different wavelengths included in the images.

In the information processing apparatus according to a sixth aspect of the present invention, it is preferable that the correlation is a relative value between positions and/or intensities of image components of the different wavelengths included in the first image and positions and/or intensities of image components of the different wavelengths included in the second image.

In the information processing apparatus according to a seventh aspect of the present invention, it is preferable that the correlation between the feature amounts of the first image and the second image is a correlation between peak positions or peak values of autocorrelation coefficients of the first image and the second image.

In the information processing apparatus according to an eighth aspect of the present invention, it is preferable that the second imaging condition is an imaging condition for outputting a reference image without the crosstalk from the image sensor as the second image, and the correlation between the feature amounts of the first image and the second image is a cross-correlation coefficient that is a cross-correlation coefficient between the first image and the reference image and that is obtained in a case where the first image and the reference image are relatively shifted.

In the information processing apparatus according to a ninth aspect of the present invention, it is preferable that the second imaging condition is an imaging condition for outputting a reference image without the crosstalk from the image sensor as the second image, and the feature amounts of the first image and the second image are a degree of matching between feature points of the first image and the reference image.

In the information processing apparatus according to a tenth aspect of the present invention, it is preferable that the second imaging condition is an imaging condition for outputting a reference image without the crosstalk from the image sensor as the second image, and the feature amounts of the first image and the second image are a degree of matching between a plurality of divided images obtained by dividing each of the first image and the reference image into a lattice form.

In the information processing apparatus according to an eleventh aspect of the present invention, it is preferable that the imaging apparatus includes an imaging optical system having a plurality of regions having characteristics different from each other, and the second imaging condition for outputting the reference image is an imaging condition for opening only one region of the plurality of regions and shielding other regions from light.

In the information processing apparatus according to a twelfth aspect of the present invention, it is preferable that the imaging apparatus includes an imaging optical system having a plurality of regions that allow transmission of light having wavelength ranges different from each other, and the second imaging condition for outputting the reference image is an imaging condition for causing only light of one wavelength range among the light having wavelength ranges different from each other to be incident on the imaging optical system.

In the information processing apparatus according to a thirteenth aspect of the present invention, it is preferable that the processor is configured to detect the crosstalk for each of a plurality of locations based on the correlation between the feature amounts of the first image and the second image for each of the plurality of locations.

In the information processing apparatus according to a fourteenth aspect of the present invention, it is preferable that the processor is configured to display information indicating whether or not the crosstalk is present or an intensity of the crosstalk for each of the plurality of locations on a display in a superimposed manner on the images output from the image sensor.

In the information processing apparatus according to a fifteenth aspect of the present invention, it is preferable that the processor is configured to perform interference removing processing of reducing the crosstalk among the images output from the image sensor, and each of the first image and the second image is an image that has been subjected to the interference removing processing.

An invention according to a sixteenth aspect is an imaging apparatus comprising an imaging optical system in which an optical element including wavelength-selective elements which respectively transmit lights having wavelength ranges different from each other for each of a plurality of regions is disposed at a pupil position or near the pupil position, an image sensor that receives subject light for each of the plurality of wavelength ranges transmitted through each of the plurality of wavelength-selective elements by splitting a pupil, and the information processing apparatus according to any of the first aspect to the fifteenth aspect.

An invention according to a seventeenth aspect is an imaging apparatus comprising a multi-focus imaging optical system having focal lengths different from each other for each of a plurality of regions, an image sensor that receives subject light transmitted through each of the plurality of regions of the imaging optical system by splitting a pupil, and the information processing apparatus according to any of the first aspect to the fifteenth aspect.

It is preferable that the imaging apparatus according to an eighteenth aspect of the present invention further comprises a plurality of first polarizing filters that are disposed to correspond to the plurality of regions and that have polarizing directions different from each other, and a plurality of second polarizing filters that are disposed in each pixel of the image sensor and that correspond to the plurality of first polarizing filters, respectively, in which the plurality of first polarizing filters and the plurality of second polarizing filters cause the subject light transmitted through the plurality of regions to be incident on the image sensor by splitting the pupil for each region.

An invention according to a nineteenth aspect is an information processing method of processing images output from an image sensor of an imaging apparatus that captures images having different characteristics by splitting a pupil, the information processing method comprising a step of acquiring a first image that is captured by the imaging apparatus with respect to a first subject under a first imaging condition and that is output from the image sensor, a step of acquiring a second image that is captured by the imaging apparatus with respect to the first subject under a second imaging condition different from the first imaging condition and that has the same characteristic as the first image among the images output from the image sensor, and a step of detecting crosstalk included in the images based on a correlation between feature amounts of the first image and the second image, in which a processor is configured to execute processing of each step.

It is preferable that the information processing method according to a twentieth aspect of the present invention further comprises a step of performing interference removing processing of reducing the crosstalk included in the images output from the image sensor, in which each of the first image and the second image is an image that has been subjected to the interference removing processing.

An invention according to a twenty-first aspect is an information processing program causing the processor to execute the processing of each step in the information processing method according to the nineteenth aspect or the twentieth aspect.

BRIEF DESCRIPTION OF THE DRAWINGS

FIG. 10 is a diagram illustrating an example of an imaging optical system of a pupil-splitting multi-focus camera.

DESCRIPTION OF THE PREFERRED EMBODIMENTS

Hereinafter, preferred embodiments of an information processing apparatus, a method, a program, and an imaging apparatus according to the embodiment of the present invention will be described in accordance with the accompanying drawings.

[Configuration of Imaging System]

Figure 1:
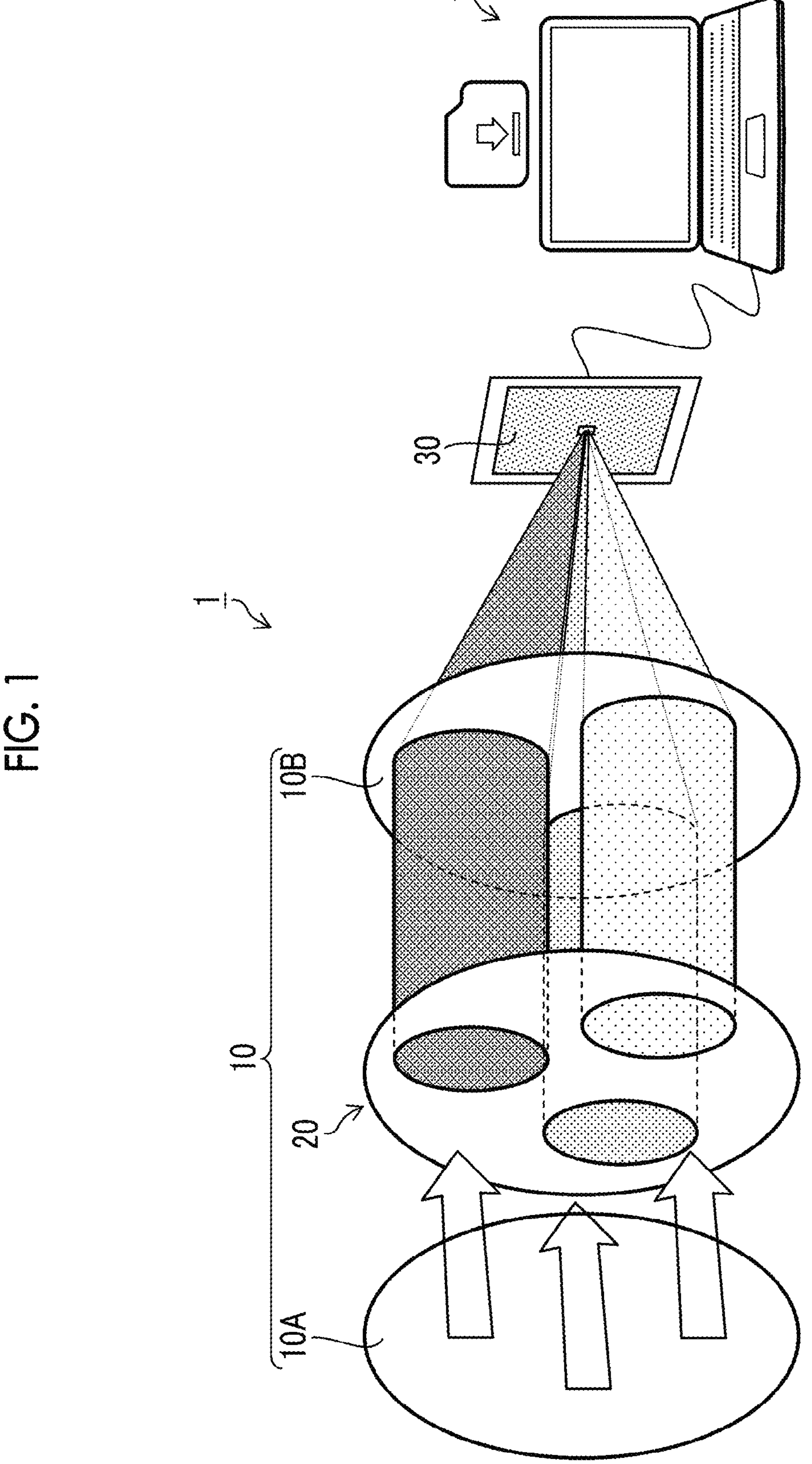
FIG. 1 is a diagram illustrating a system configuration of an imaging system including an information processing apparatus according to an embodiment of the present invention.

FIG. 1 is a diagram illustrating a system configuration of an imaging system including the information processing apparatus according to the embodiment of the present invention.

The imaging system illustrated in FIG. 1 is composed of an imaging apparatus 1 and an information processing apparatus 2.

The imaging apparatus 1 illustrated in FIG. 1 is a multispectral camera that captures a plurality of images (multispectral image) having different wavelength ranges and comprises an imaging optical system 10, an image sensor 30, and a signal processing part (not illustrated).

The imaging optical system 10 of the present example includes a front group lens 10A and a rear group lens 10B, in which an optical element (filter unit) 20 including wavelength-selective elements which respectively transmit lights having wavelength ranges different from each other is disposed at a pupil position or near the pupil position between the front group lens 10A and the rear group lens 10B.

Figure 2:
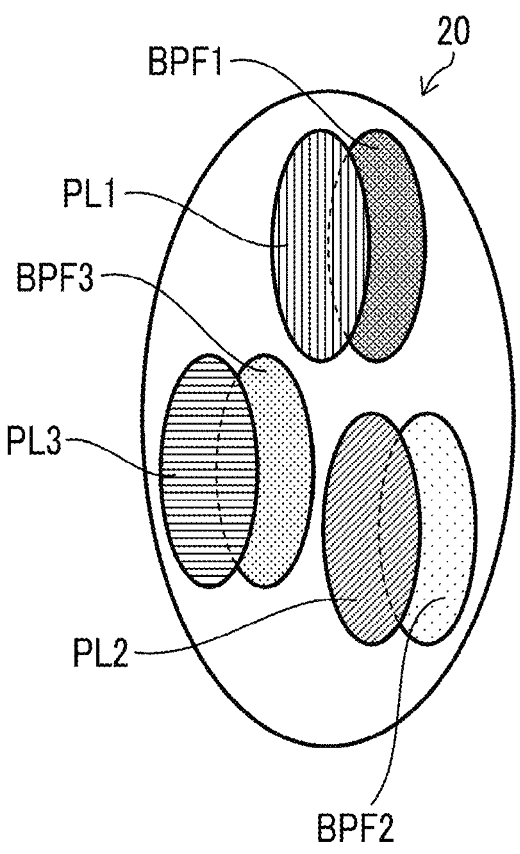
FIG. 2 is a perspective view illustrating a filter unit disposed in an imaging optical system of an imaging apparatus illustrated in FIG. 1.

FIG. 2 is a perspective view illustrating the filter unit disposed in the imaging optical system illustrated in FIG. 1.

As illustrated in FIG. 2, the filter unit 20 has an opening region (in the example illustrated in FIG. 2, three circular opening regions at equal intervals) that allows transmission of light of different transmission wavelength ranges. The filter unit 20 includes a wavelength-selective element (first bandpass filter BPF1) that allows transmission of light of a first wavelength range (λ1), a wavelength-selective element (second bandpass filter BPF2) that allows transmission of light of a second wavelength range (λ2), and a wavelength-selective element (third bandpass filter BPF3) that allows transmission of light of a third wavelength range (λ3).

In addition, a plurality of (in the present example, three) polarizing filters (first polarizing filters) PL1, PL2, and PL3 having different polarizing directions are disposed in the opening region of the filter unit 20. The polarizing filter PL1 absorbs a left-right direction component of unpolarized light and allows transmission of an up-down direction component of the unpolarized light in FIG. 2. Hereinafter, it will be assumed that a direction (polarizing direction) of linearly polarized light transmitted through the polarizing filter PL1 is 0°.

In a case where a clockwise direction in FIG. 2 is positive, the polarizing direction of the linearly polarized light transmitted through the polarizing filter PL2 is 45°, and the polarizing direction of the linearly polarized light transmitted through the polarizing filter PL3 is 90°. That is, the three polarizing filters PL1, PL2, and PL3 are disposed to have different polarizing directions from each other. The polarizing directions of the polarizing filters PL1, PL2, and PL3 are not limited to 0°, 45°, and 90° and may be, for example, 0°, 60°, and 120°.

With reference to FIG. 2 again, light emitted from a subject is transmitted through the three opening regions of the imaging optical system 10 and is incident on the image sensor 30 as subject light having different wavelength ranges and different polarizing directions from each other.

Figure 3:
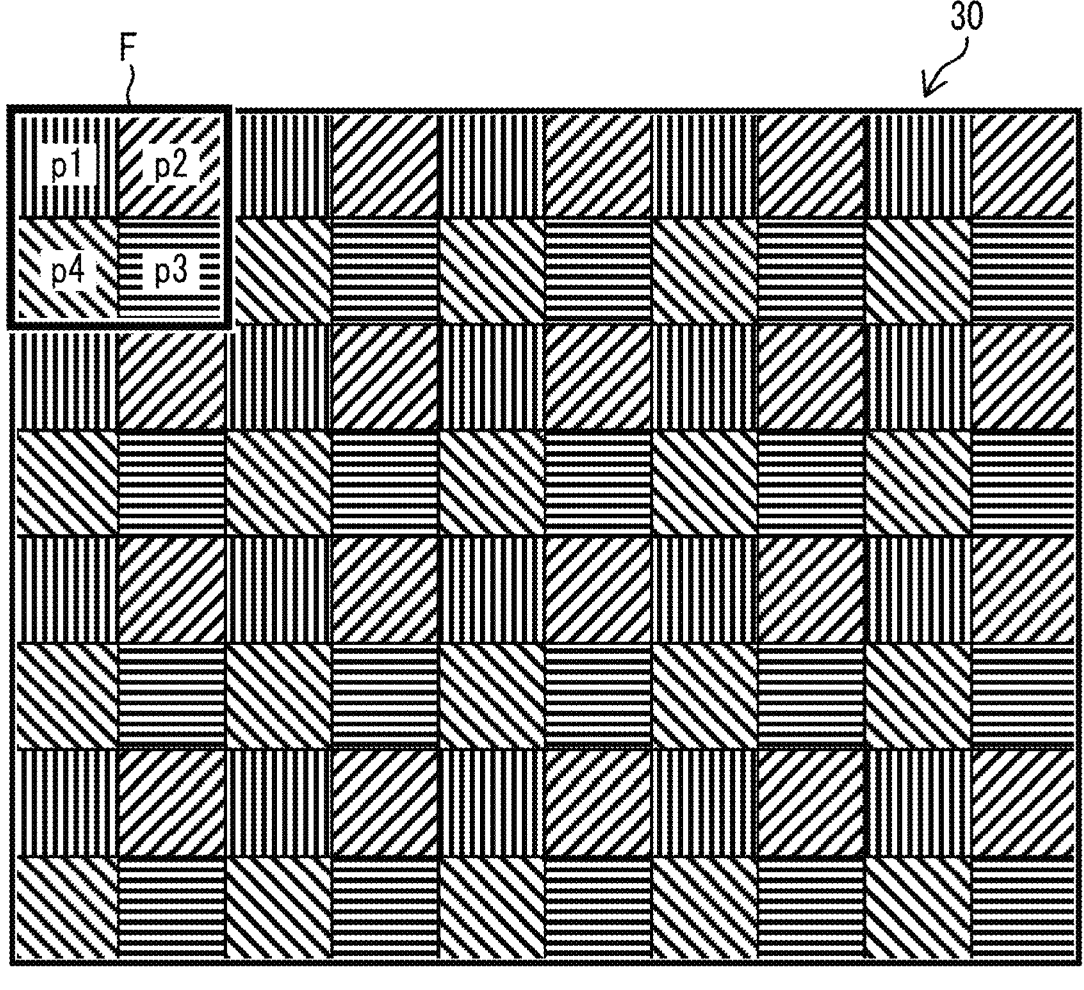
FIG. 3 is a plan view of an image sensor of the imaging apparatus illustrated in FIG. 1 and is a diagram illustrating a micropolarizer disposed in each pixel of the image sensor.

FIG. 3 is a plan view of the image sensor illustrated in FIG. 1 and is a diagram illustrating a micropolarizer disposed in each pixel of the image sensor.

As illustrated in FIG. 3, four micropolarizers (second polarizing filters) p1, p2, p3, and p4 having different polarizing directions are disposed in each pixel of the image sensor 30. In FIG. 3, the micropolarizer p1 allows transmission of the up-down direction component of an incidence ray and causes the up-down direction component of the incidence ray to be received in the pixel in which the micropolarizer p1 is disposed. In a case where the polarizing direction of the micropolarizer p1 is 0°, the polarizing directions of the micropolarizers p2, p3, and p4 are 45°, 90°, and 135°.

In a case where four micropolarizers p1 to p4 adjacent to each other are referred to as a basic arrangement pattern F, the micropolarizers p1 to p4 of the basic arrangement pattern F are repeatedly arranged in an up-down direction and in a left-right direction in FIG. 3 in each pixel of the image sensor 30.

The polarizing filters PL1, PL2, and PL3 (FIG. 2) disposed in the three opening regions of the filter unit 20, respectively, and the micropolarizers p1, p2, p3, and p4 disposed on each pixel of the image sensor 30 are a pupil-splitting part that splits a pupil for the subject light of different wavelength ranges transmitted through the three opening regions of the imaging optical system 10, respectively, and that causes each subject light to be incident on the pixels of the image sensor 30 having corresponding polarizing directions. That is, in the present example, a "polarizing" pupil-splitting part that separates the subject light having different wavelength ranges using polarization of light is employed.

However, in this type of pupil-splitting imaging apparatus 1, the subject light having different wavelength ranges cannot be completely separated, and multiple images of an image of the first wavelength range (λ1) are obtained because of a phenomenon referred to as "crosstalk" or "interference" in which an image component of the second wavelength range (λ2) and an image component of the third wavelength range (λ3) are added or subtracted to or from the image of the first wavelength range (λ1). Similarly, multiple images of the image of the second wavelength range (λ2) and the image of the third wavelength range (λ3) are obtained.

Thus, crosstalk correction (interference removing processing) of removing the multiple images from an image output from the image sensor 30 by measuring an amount of occurrence of the crosstalk in advance to obtain a correction amount is performed.

That is, the signal processing part of the imaging apparatus 1, not illustrated, performs the interference removing processing of removing the multiple images from the image output from the image sensor 30 as illustrated below.

In a case where signal values that are output from the image sensor 30 and that are output from the pixels (polarizing pixels) of polarizing directions of 0°, 45°, and 90° in which the micropolarizers p1, p2, and p3 are disposed are denoted by S1, S2, and S3, respectively, and correction amounts (interference removing parameters) indicating a ratio of interference are denoted by C11 to C33, the signal processing part of the imaging apparatus 1 calculates signal values S(λ1), S(λ2), and S(λ3) after the interference removing using [Expression 2] below.

$$S(\lambda1) = C11*S1 + C12*S2 + C13*S3 \quad \text{[Expression 2]}$$

$$S(\lambda2) = C21*S1 + C22*S2 + C23*S3$$

$$S(\lambda3) = C31*S1 + C32*S2 + C33*S3$$

While the interference removing parameters (C11 to C33) change under various conditions such as individual cameras and a focus position, the interference removing parameters can be measured in advance and stored.

By performing the operation in [Expression 2] above for all pixels of the multispectral image, an image in which crosstalk (interference component) between images output from the image sensor 30 of the imaging apparatus 1 is reduced can be generated.

However, in a case where the imaging apparatus 1 is actually used, the imaging condition (states of the camera, the lenses, and the subject) in a case where the interference removing parameters (C11 to C33) are obtained may change, and insufficient correction or overcorrection may occur.

Accordingly, a problem arises in that the multiple images removed through the interference removing processing appear again in the image output from the imaging apparatus 1.

While it is considered to visually check whether or not the multiple images caused by the crosstalk are included in the multispectral image by displaying the multispectral image after the interference removing on a display, it is difficult to visually recognize minute multiple images, and it is also difficult to determine whether the multiple images are an edge part of the subject or the multiple images caused by the crosstalk.

The information processing apparatus 2 illustrated in FIG. 1 detects the crosstalk (whether or not the crosstalk is present, a magnitude of the crosstalk, and the like) included in the image by processing the image output from the image sensor 30 of the imaging apparatus 1.

[Information Processing Apparatus]

The information processing apparatus 2 can be composed of, for example, a personal computer (PC) as illustrated in FIG. 1 and acquires the image output from the image sensor 30 of the imaging apparatus 1 through wired or wireless communication or through recording media (memory card).

The information processing apparatus 2 acquires three images of the image (λ1) corresponding to the first wavelength range (λ1), the image (λ2) corresponding to the second wavelength range (λ2), and the image (λ3) corresponding to the third wavelength range (λ3). In addition, as will be described later, the information processing apparatus 2 changes the imaging condition to acquire at least three first images (the image (λ1), the image (λ2), and the image (λ3)) captured under a first imaging condition with respect to the subject (first subject) and at least three second images (the image (λ1), the image (λ2), and the image (λ3)) captured under a second imaging condition with respect to the same subject (first subject). Here, the second imaging condition is an imaging condition for changing feature amounts of the first image and the second image with respect to the first imaging condition in a case where the crosstalk occurs.

Figure 4:
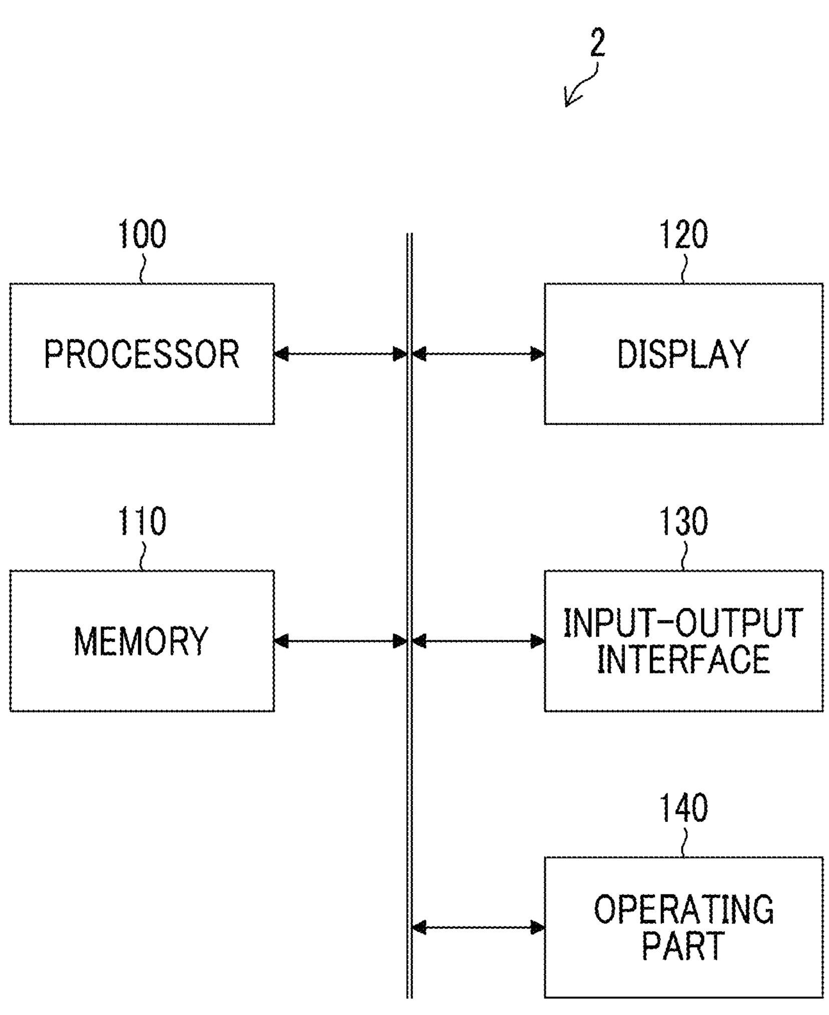
FIG. 4 is a block diagram illustrating an embodiment of a hardware configuration of the information processing apparatus according to the embodiment of the present invention.

FIG. 4 is a block diagram illustrating an embodiment of a hardware configuration of the information processing apparatus according to the embodiment of the present invention.

As illustrated in FIG. 4, the information processing apparatus 2 composed of a PC comprises a processor 100, a memory 110, a display 120, an input-output interface 130, an operating part 140, and the like.

The processor 100 is composed of a central processing unit (CPU) or the like, manages and controls each part of the information processing apparatus 2, and functions as various information processing parts including detection of the crosstalk.

The memory 110 includes a flash memory, a read-only memory (ROM), a random access memory (RAM), a hard disk apparatus, and the like. The flash memory, the ROM, or the hard disk apparatus is a non-volatile memory storing an operating system, an information processing program according to the embodiment of the present invention, and the like. In addition, the flash memory or the hard disk apparatus stores the image acquired from the imaging apparatus 1, a detection result of the crosstalk, and the like.

The RAM functions as a work region of information processing performed by the processor 100 and temporarily stores the information processing program and the like stored in the flash memory or the like. The processor 100 may incorporate a part (RAM) of the memory 110.

The display 120 displays a screen for operating the information processing apparatus 2 and displays the image acquired from the imaging apparatus 1, the detection result of the crosstalk, and the like.

The input-output interface 130 includes a connecting part connectable to an external apparatus, a communication part connectable to a network, and the like. Examples of the connecting part connectable to the external apparatus include a universal serial bus (USB), a High-Definition Multimedia Interface (HDMI) (HDMI is a registered trademark), and a card slot in which a memory card is mounted.

The operating part 140 is a part that includes a pointing device such as a mouse and a touchpad, a keyboard, and the like and that receives various operation inputs provided by a user.

Principle of Present Invention

Figures 5A, 5B:
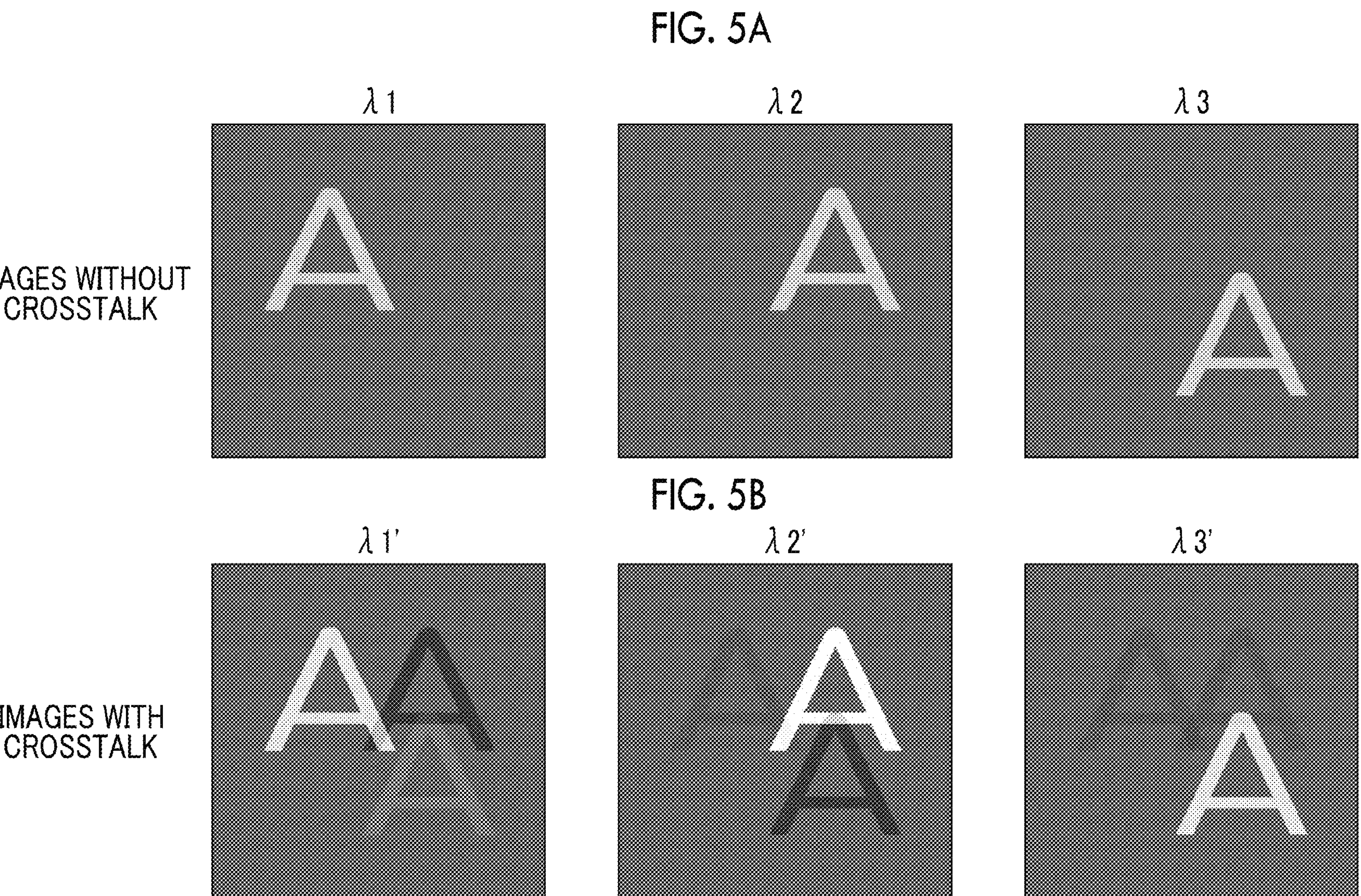
FIGS. 5A and 5B are diagrams illustrating images without crosstalk and images with the crosstalk.

FIGS. 5A and 5B are diagrams illustrating images without the crosstalk and images with the crosstalk.

In FIG. 5A illustrates three images without the crosstalk, that is, the image of only the first wavelength range (λ1), the image of only the second wavelength range (λ2), and the image of only the third wavelength range (λ3).

On the other hand, FIG. 5B illustrates three images with the crosstalk. In FIG. 5B, an image in which the image (λ2) and the image (λ3) are reflected in the image (λ1) is referred to as an image (λ1'). An image in which the image (λ1) and the image (λ3) are reflected in the image (λ2) is referred to as an image (λ2'). An image in which the image (λ1) and the image (λ2) are reflected in the image (λ3) is referred to as an image (λ3').

As illustrated in FIG. 5B, the magnitude of the crosstalk is not uniform in the three images with the crosstalk. For example, the image (λ2) is significantly reflected in the image (λ1'), the image (λ3) is significantly reflected in the image (λ2'), and the image (λ1) and the image (λ2) are less reflected in the image (λ3').

The reason why the multiple images appear as illustrated in the image (λ1') in FIG. 5B is because the image (λ2) and the image (λ3) are reflected in the image (λ1) as described above, and this is caused by the presence of parallax because of different pupil positions of the three opening regions through which rays of λ1, λ2, and λ3 pass (refer to FIG. 1).

In addition, positions and intensities of the multiple images generated by the crosstalk change in a case where the imaging condition (for example, the focus position, an imaging magnification (angle of view), an illumination condition, and a relative position between the subject and the imaging apparatus) changes. Normally (in an image with astigmatism that optically occurs), a change of the imaging condition does not result in a change of an interval or a change of an intensity ratio of the multiple images.

In the case of changing the imaging condition from a focus position A to a focus position B, it is assumed that the multiple images appear at the focus position A. The multiple images appearing at the focus position A move in a case where the focus position A is changed to the focus position B.

Therefore, in the present invention, the crosstalk is detected by focusing on a change specific to the multiple images generated by the crosstalk because of a change of the imaging condition.

First Embodiment of Information Processing Apparatus

Next, a first embodiment of the information processing apparatus according to the embodiment of the present invention will be described.

Figure 6:
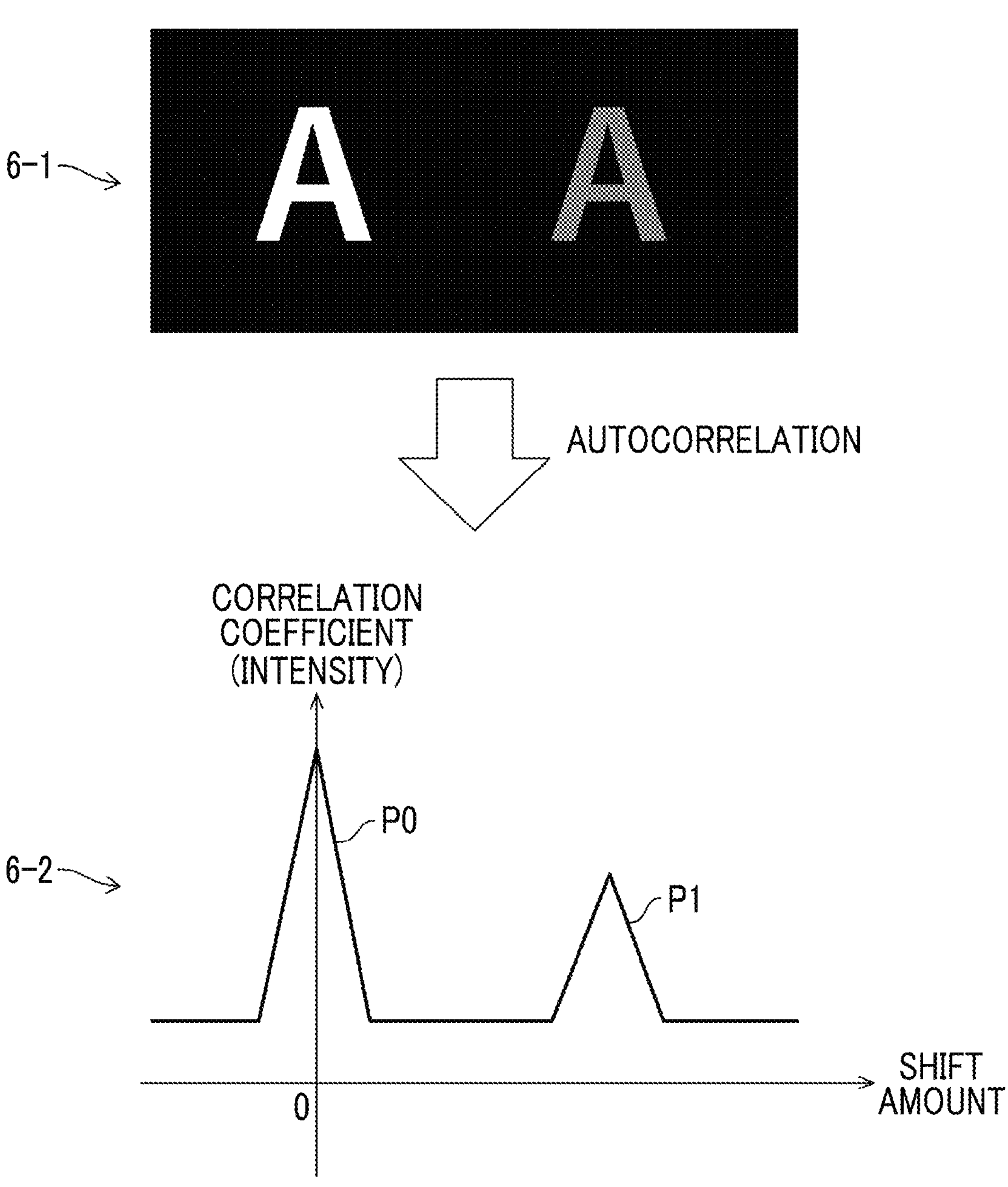
FIG. 6 is a diagram illustrating a first image captured under a first imaging condition and an autocorrelation coefficient of the first image.

FIG. 6 is a diagram illustrating the first image captured under the first imaging condition and an autocorrelation coefficient of the first image.

The first image illustrated in 6-1 in FIG. 6 is an image with the crosstalk, and double images appear in the first image because of the crosstalk. For simplification of description, it is assumed that images of different wavelengths of the same subject are reflected at different positions in the left-right direction in the double images in FIG. 6.

In FIG. 6, 6-2 is a diagram illustrating the autocorrelation coefficient of the first image.

The autocorrelation coefficient of the first image illustrated in 6-2 in FIG. 6 is obtained by shifting among the first images in the left-right direction in FIG. 6 and has two peaks P0 and P1.

The peak P0 is a peak in a case where a shift amount among the first images is 0 and has a maximum value as the autocorrelation coefficient. The peak P1 is a peak that occurs in a case where the shift amount among the first images is a shift amount corresponding to an interval of the double images in the first image and has a smaller peak value than the peak P0. The peak value of the peak P1 has a value that is increased as a light quantity reflected by the crosstalk is increased.

Figure 7:
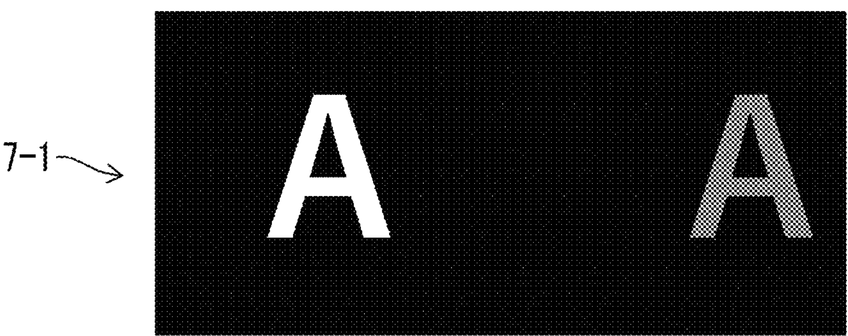
FIG. 7 is a diagram illustrating a second image captured under a second imaging condition having a different focus position from the first imaging condition and an autocorrelation coefficient of the second image.
Figure 7:
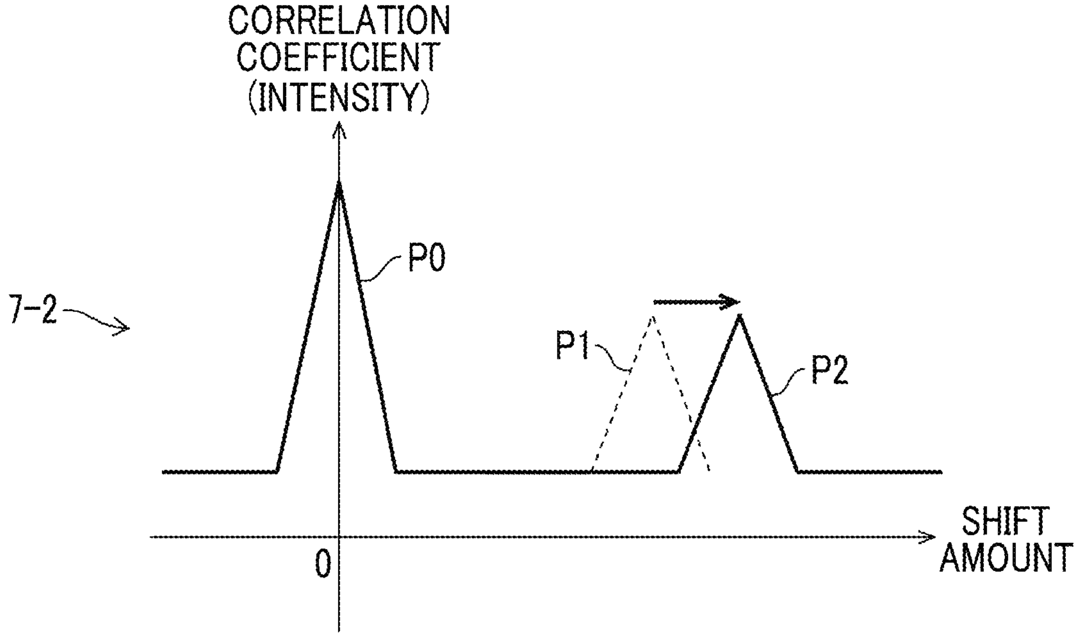

FIG. 7 is a diagram illustrating the second image captured under the second imaging condition having a different focus position from the first imaging condition and an autocorrelation coefficient of the second image.

The second image illustrated in 7-1 in FIG. 7 is an image with the crosstalk, and double images appear in the second image because of the crosstalk.

The second image illustrated in 7-1 in FIG. 7 is an image having the same characteristic as the first image illustrated in 6-1 in FIG. 6. For example, in a case where the first image illustrated in 6-1 is the image (λ1') with the crosstalk, the second image is also the image (λ1') with the crosstalk having the same wavelength range, and both of the first image and the second image are images having different focus positions. Here, the characteristic is a characteristic of an image to be used for detecting the crosstalk and is, for example, an optical characteristic provided by transmission through a specific pupil region. Here, the wavelength range corresponds to the optical characteristic. The imaging apparatus that captures images having different characteristics by splitting the pupil is an apparatus such as a multispectral camera that performs capturing through a plurality of optical filters having different wavelength ranges in a plurality of regions of the pupil position and is an apparatus that captures images having different wavelength ranges (different characteristics).

In addition, as illustrated in 7-1 in FIG. 7, the interval of the double images of the second image is wider than the interval of the double images of the first image illustrated in 6-1 in FIG. 6. This is because the multiple images have moved because of a change of the focus position. While the interval of the double images of the second image is wider than the interval of the double images of the first image in the present example, the interval of the double images of the second image may be narrower than the interval of the double images of the first image.

In FIG. 7, 7-2 is a diagram illustrating the autocorrelation coefficient of the second image.

The autocorrelation coefficient of the second image illustrated in 7-2 in FIG. 7 is obtained by shifting among the second images in the left-right direction in FIG. 7 and has two peaks P0 and P2.

The peak P0 is a peak in a case where a shift amount among the second images is 0 and has a maximum value as the autocorrelation coefficient. The peak P2 is a peak that occurs in a case where the shift amount among the second images is a shift amount corresponding to the interval of the double images in the second image and has a smaller peak value than the peak P0.

In 7-2 in FIG. 7, the peak P2 has moved to the left side in FIG. 7 as illustrated by an arrow with respect to the peak P1 of the first image illustrated by a dotted line.

From a change of a relative value of a correlation in each of the first image and the second image having different focus positions (in the present example, changes of peak positions of the peak P1 of the autocorrelation coefficient of the first image and the peak P2 of the autocorrelation coefficient of the second image), it can be determined that the crosstalk is included in the first image and in the second image.

The processor 100 illustrated in FIG. 4 acquires the first image and the second image having different focus positions as a target for the information processing, through the input-output interface 130 based on the operation input provided using the operating part 140.

Next, the processor 100 calculates the autocorrelation coefficient of the acquired first image and the autocorrelation coefficient of the acquired second image. While the images are shifted in the left-right direction in calculating the autocorrelation coefficients in the examples illustrated in FIG. 6 and FIG. 7, the images are shifted within a predetermined two-dimensional range (a range having a probability of occurrence of the multiple images) to calculate the autocorrelation coefficients. In addition, in the case of the images with the crosstalk illustrated in FIG. 5B, three peaks including the peak in a case where the shift amount is 0 occur as peaks of the autocorrelation coefficient. This is because two images are mixed in with parallax because of the crosstalk.

The processor 100 detects the crosstalk included in the image (the first image and the second image) based on a correlation between the feature amounts of the first image and the second image. That is, in the first embodiment, the processor 100 determines that the image has the crosstalk in a case where the peak P1 is present at a position at which the shift amount is a shift amount other than 0 in the autocorrelation coefficient of the first image as illustrated in 6-2 in FIG. 6, the peak P2 is also present at a position at which the shift amount is a shift amount other than 0 in the autocorrelation coefficient of the first image as illustrated in 7-2 in FIG. 7, and the peak positions of the peak P1 and the peak P2 move in accordance with movement of the focus positions of the first image and the second image. It is preferable that the peak P1 and the peak P2 have similar peak values and shapes, and only the peak positions of the peak P1 and the peak P2 are different.

The processor 100 determines that the image (the first image and the second image) does not have the crosstalk in a case where the peak P1 and the peak P2 as described above are not present in the autocorrelation coefficients of the first image and the second image.

While the first image and the second image having different focus positions to be used for detecting the crosstalk are images having the same characteristic (in the present example, the same wavelength range), the crosstalk can be detected for each set of the first image and the second image for each of a plurality of wavelength ranges that can be acquired at the same time. In this case, accuracy of detection of the crosstalk is further improved.

In addition, detection of the crosstalk is not limited to the first image and the second image of two focus positions and, for example, may be performed based on the autocorrelation coefficient calculated from each image using the first image, the second image, and a third image of three focus positions.

Furthermore, a case of calculating the autocorrelation coefficient from each of the first image and the second image is not limited to a case of calculating the autocorrelation coefficient of the entire image. The autocorrelation coefficient may be calculated for each divided division region by dividing the image into a plurality of regions. According to this, which region of the image the crosstalk (multiple images) is present in is perceived in a case where the image has the crosstalk.

Second Embodiment of Information Processing Apparatus

Next, a second embodiment of the information processing apparatus according to the embodiment of the present invention will be described.

The imaging apparatus 1 acquires the first image (multispectral image) captured under a first illumination condition and the second image (multispectral image) captured under a second illumination condition different from the first illumination condition.

The information processing apparatus of the second embodiment acquires the first image and the second image captured under the first illumination condition and the second illumination condition and detects the crosstalk based on the first image and the second image.

Figure 8:
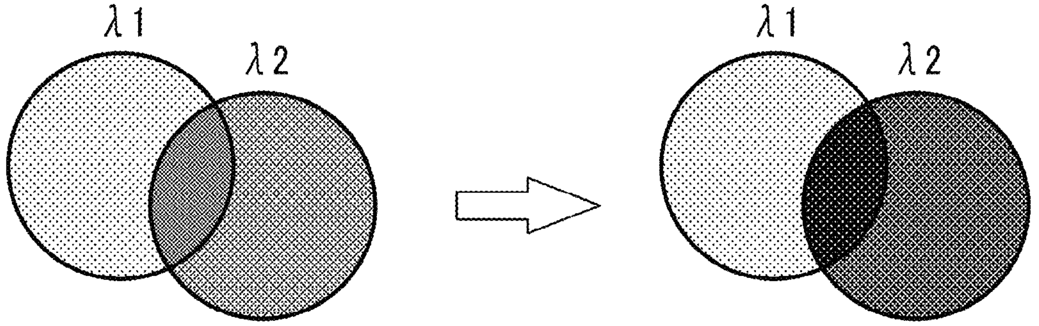
FIG. 8 is a diagram illustrating an example of a change of multiple images before and after a change of an illumination condition for a subject in a case where multiple images occur.

FIG. 8 is a diagram illustrating an example of a change of the multiple images before and after a change of the illumination condition for the subject in a case where the multiple images occur.

The change of the illumination condition for the subject illustrated in FIG. 8 is made by changing an intensity of a wavelength of illumination light to change the illumination condition. Specifically, an intensity of the illumination light of the second wavelength λ2 out of the illumination light of the first wavelength λ1 and the illumination light of the second wavelength λ2 is weakened.

In capturing multispectral images of the first wavelength λ1 and the second wavelength λ2, in a case where the crosstalk is present in each of the first image captured under an illumination condition and the second image captured by changing the illumination condition, double images of the image of the first wavelength λ1 and the image of the second wavelength λ2 are obtained as illustrated in FIG. 8.

In capturing the second image by changing the illumination condition, in a case where the intensity of the illumination light of the second wavelength λ2 is weakened, the image of the second wavelength λ2 in the double images of the second image is dark (light) with respect to the image of the second wavelength λ2 in the double images of the first image.

In the second embodiment of the information processing apparatus, the crosstalk is detected based on a change of density of the multiple images (double images) that is changed by changing the illumination condition.

Figure 9:
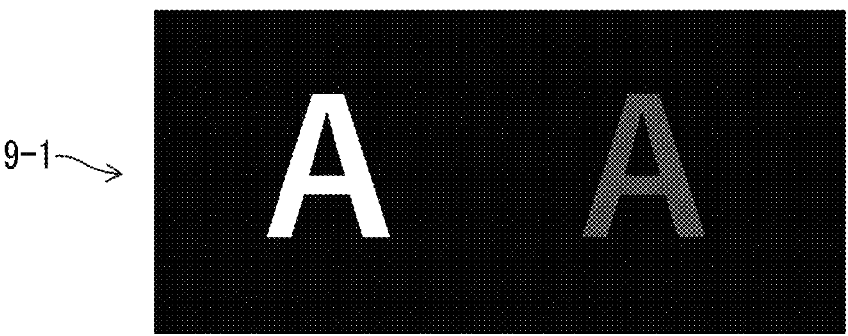
FIG. 9 is a diagram illustrating the second image captured under the second imaging condition having a different illumination condition for the subject from the first imaging condition and the autocorrelation coefficient of the second image.
Figure 9:
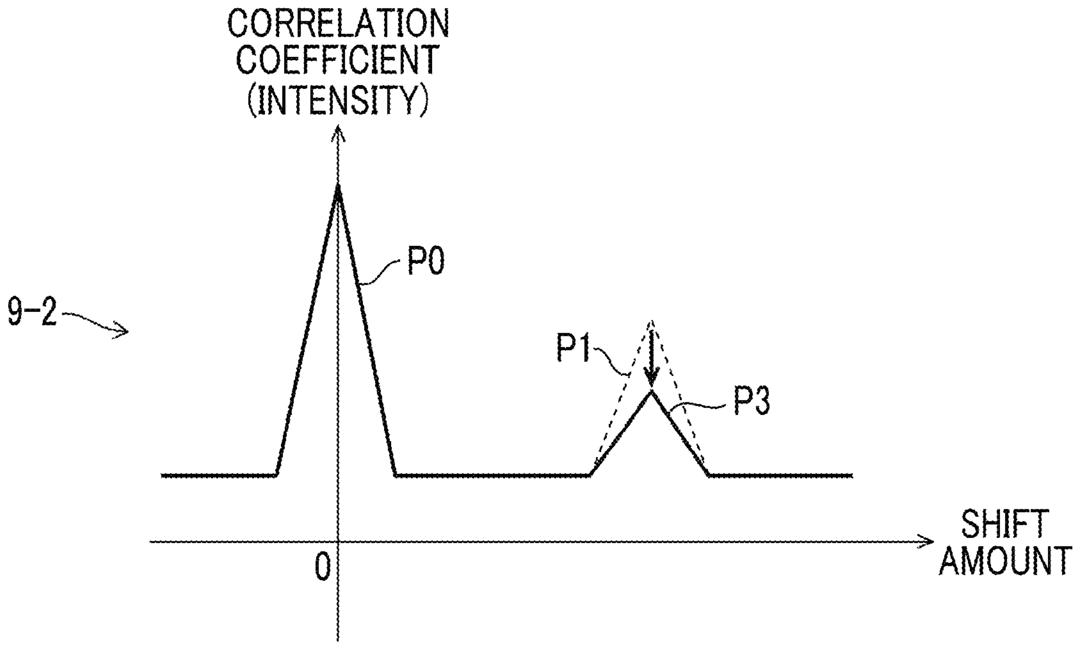

FIG. 9 is a diagram illustrating the second image captured under the second imaging condition having a different illumination condition for the subject from the first imaging condition and the autocorrelation coefficient of the second image.

The illumination condition is changed to the illumination condition in capturing the second image by, for example, weakening the intensity of the illumination light of the second wavelength λ2 out of the illumination light of the first wavelength λ1 and the illumination light of the second wavelength λ2 as illustrated in FIG. 8 with respect to the illumination condition in capturing the first image.

The second image illustrated in 9-1 in FIG. 9 is an image with the crosstalk, and double images appear in the second image because of the crosstalk.

The second image illustrated in 9-1 in FIG. 9 is an image having the same characteristic as the first image illustrated in 6-1 in FIG. 6. For example, in the case of the image (λ1') with the crosstalk in which the image of the wavelength λ2 is reflected in the image of the wavelength λ1, the second image is also the image (λ1') with the crosstalk having the same wavelength range, and both of the first image and the second image are images having different illumination conditions.

In addition, as illustrated in 9-1 in FIG. 9, the image of the wavelength λ2 (the image on the right side) reflected in the image of the wavelength λ1 (the image on the left side) is light in density, compared to the image of the wavelength λ2 (the image on the right side) reflected in the image of the wavelength λ1 (the image on the left side) illustrated in 6-1 in FIG. 6. This is because the intensity of the illumination light of the wavelength λ2 is weakened in capturing the second image.

In FIG. 9, 9-2 is a diagram illustrating the autocorrelation coefficient of the second image.

The autocorrelation coefficient of the second image illustrated in 9-2 in FIG. 9 is obtained by shifting among the second images in the left-right direction in FIG. 9 and has two peaks P0 and P3.

The peak P0 is a peak in a case where a shift amount among the second images is 0 and has a maximum value as the autocorrelation coefficient. The peak P3 is a peak that occurs in a case where the shift amount among the second images is a shift amount corresponding to the interval of the double images in the second image and has a smaller peak value than the peak P0.

In 9-2 in FIG. 9, the peak value of the peak P3 is decreased as illustrated by an arrow with respect to the peak P1 of the first image illustrated by a dotted line.

From a change of the autocorrelation coefficient in each of the first image and the second image having different illumination conditions (in the present example, changes of the peak values of the peak P1 of the autocorrelation coefficient of the first image and the peak P3 of the autocorrelation coefficient of the second image), it can be determined that the crosstalk is included in the first image and in the second image.

The processor 100 illustrated in FIG. 4 acquires the first image and the second image having different illumination conditions as a target for the information processing, through the input-output interface 130 based on the operation input provided using the operating part 140.

Next, the processor 100 calculates the autocorrelation coefficient of the acquired first image and the autocorrelation coefficient of the acquired second image. In the second embodiment, the processor 100 determines that the image has the crosstalk in a case where the peak P1 is present at a position at which the shift amount is a shift amount other than 0 in the autocorrelation coefficient of the first image as illustrated in 6-2 in FIG. 6, the peak P3 is also present at a position at which the shift amount is a shift amount other than 0 in the autocorrelation coefficient of the first image as illustrated in 9-2 in FIG. 9, and the peak values of the peak P1 and the peak P3 change in accordance with a change of the illumination condition. The peak P1 and the peak P3 are present at positions of the same shift amount. In addition, in the present example, since the intensity of the illumination light of the wavelength λ2 corresponding to the image of the wavelength λ2 reflected in the image of the wavelength λ1 is weakened, the peak P3 is decreased below the peak P1. However, in a case where the intensity of the illumination light of the wavelength λ2 is strengthened, the peak P3 is increased above the peak P1.

The following aspects are considered as aspects for changing an intensity of a wavelength.

(1) In capturing the second image, only one opening region of a plurality of opening regions (in the example illustrated in FIG. 2, three opening regions) of the filter unit 20 is open, and the other opening regions are shielded from light. In this case, only the light of the transmission wavelength range of the bandpass filter provided in one opening region is obtained.

(2) In capturing the second image, a bandpass filter that allows transmission of only one wavelength is mounted in front of the imaging optical system 10.

(3) In capturing the second image, a single-wavelength light source of one wavelength is used.

(4) In capturing the second image, a light source (single-wavelength light source) different from a light source in capturing the first image is added.

In addition, as another aspect for changing the illumination condition, it is considered to change an irradiation pattern of the illumination light. For example, a spot light source that illuminates only the center of a screen is used.

Furthermore, a change of the imaging condition in the case of capturing the first image and the second image includes a change of a relative position (a position at which the subject is captured) between an object (subject) and the imaging apparatus, in addition to a change of the focus position and a change of the illumination condition described above.

A change of the position at which the subject is captured includes a case where the position at which the subject is captured is changed by moving the camera and a case where the position at which the subject is captured is changed by moving the subject.

Furthermore, in the present invention, while the crosstalk included in the image is detected based on the correlation between the feature amounts of the first image and the second image, a cross-correlation may be obtained as the correlation between the feature amounts of the first image and the second image, in addition to the autocorrelation of each of the first image and the second image illustrated in 6-2 in FIG. 6, 7-2 in FIGS. 7, and 9-2 in FIG. 9.

In the case of detecting the crosstalk included in the image based on the cross-correlation, a normal multispectral image (first image) is captured, a reference image (second image) without the multiple images is captured, and a cross-correlation coefficient between the first image and the second image is calculated.

The reference image (second image) without the multiple images can be acquired by (1) performing capturing with only one opening region of the plurality of opening regions of the filter unit 20 open, (2) performing capturing with the bandpass filter mounted in front of the imaging optical system 10, or (3) performing capturing using the single-wavelength light source, in capturing via the imaging apparatus 1.

The processor 100 can determine a degree of similarity between the first image and the second image (that is, whether or not the first image is multiple images) from the cross-correlation coefficient between the first image and the second image. A case of calculating the cross-correlation coefficient between the first image and the second image is not limited to a case of calculating the cross-correlation coefficient of the entire image. The cross-correlation coefficient may be calculated for each divided region by dividing the image into a plurality of regions. According to this, which region of the image the crosstalk (multiple images) is present in is perceived in a case where the image has the crosstalk.

In addition, the correlation between the feature amounts of the first image and the second image is not limited to the correlation acquired by calculating the autocorrelation coefficients and the cross-correlation coefficient and, for example, may be acquired using feature amount matching, the Fourier transform, and the like.

In the feature amount matching, the normal multispectral image (first image) and the reference image (second image) without the multiple images can be acquired in the same manner as those for the cross-correlation coefficient, the feature amounts (feature points) such as an edge of the second image can be extracted, and then whether or not the crosstalk (multiple images) is present in the first image can be determined based on a degree of matching between the feature point of the second image and the feature point of the first image. In addition, the crosstalk may be detected using the degree of matching among a plurality of divided images obtained by dividing the image into a lattice form, or by detecting a similar object in the same image.

In addition, each of the first image and the second image may be subjected to the Fourier transform to be converted into information in a frequency domain, and then the crosstalk may be detected from a ratio of match between the first image and the second image in the frequency domain. The characteristic is an amount that reflects a crosstalk amount between the first image and the second image and is, for example, a value of an intensity with respect to the shift amount.

Other Embodiments of Imaging Apparatus

While the imaging apparatus 1 illustrated in FIG. 1 is a multispectral camera, the imaging apparatus that captures images having different characteristics from each other by splitting the pupil is not limited to a multispectral camera, and various cameras can be considered.

Figure 10:
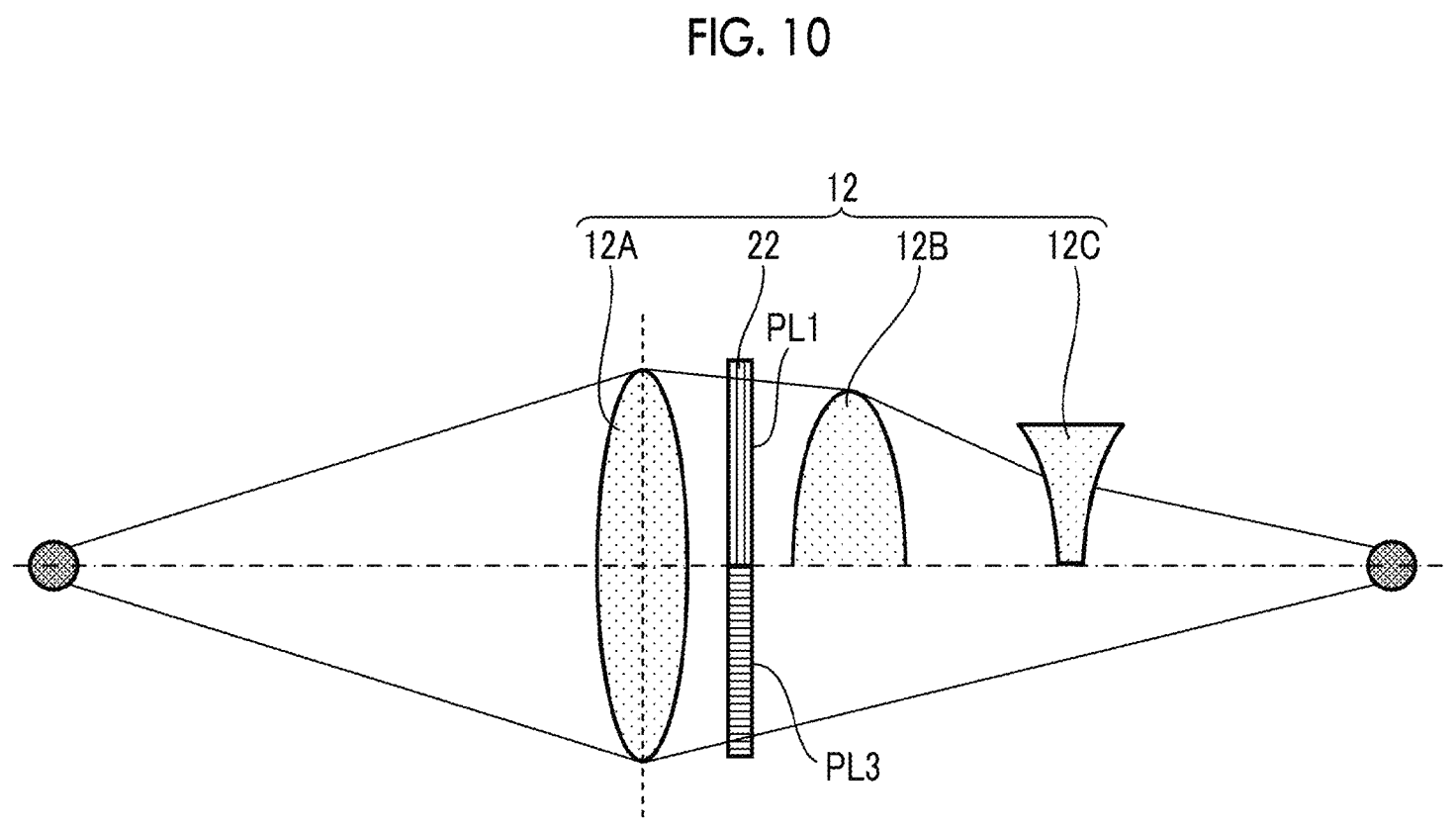

FIG. 10 is a diagram illustrating an example of an imaging optical system of a pupil-splitting multi-focus camera.

An imaging optical system 12 illustrated in FIG. 10 includes three lenses 12A, 12B, and 12C and a polarizing filter unit 22.

The lenses 12B and 12C among the three lenses 12A, 12B, and 12C are lenses of only an upper half from an optical axis in FIG. 10. An upper half of an opening region of the imaging optical system 12 constitutes a telephoto optical system with an upper half of the lens 12A and with the lenses 12B and 12C, and a lower half of the opening region of the imaging optical system 12 constitutes a wide angle optical system consisting of only a lower half of the lens 12A.

That is, the imaging optical system 12 is a multi-focus (dual-focus) lens of different focal lengths of which a pupil is split into upper and lower parts (split into two parts) in FIG. 10.

The polarizing filter unit 22 is disposed between the lens 12A and the lens 12B and comprises the polarizing filters PL1 and PL3 having the polarizing directions of 0° and 90° orthogonal to each other.

While illustration is not provided, an image sensor of the pupil-splitting multi-focus camera including the imaging optical system 12 may comprise the micropolarizers p1 and p3 having the polarizing directions of 0° and 90° among the four micropolarizers (second polarizing filters) p1, p2, p3, and p4 disposed in the pixels of the image sensor 30 illustrated in FIG. 3.

The polarizing filters PL1 and PL3 of the polarizing filter unit 22 and the micropolarizers p1 and p3 of the image sensor function as the pupil-splitting part. Linearly polarized light (a telephoto image formed by the telephoto optical system) transmitted through the polarizing filter PL1 is incident on the pixel of the image sensor in which the micropolarizer p1 is disposed. Linearly polarized light (an optical image formed by the wide angle optical system) transmitted through the polarizing filter PL3 is incident on the pixel of the image sensor in which the micropolarizer p3 is disposed.

Accordingly, the pupil-splitting multi-focus camera can capture images (a telephoto image and a wide angle image) having different characteristics by splitting the pupil. Here, the characteristic is a characteristic of an image to be used for detecting the crosstalk and is, for example, an optical characteristic provided by transmission through a specific pupil region. Here, an angle of view provided by the telephoto optical system and an angle of view provided by the wide angle optical system correspond to the optical characteristic.

In the pupil-splitting multi-focus camera that captures two images of the telephoto image and the wide angle image, the crosstalk between the images of the telephoto image and the wide angle image can be reduced by the polarizing filters PL1 and PL3 and the micropolarizers p1 and p3 having the polarizing directions orthogonal to each other. Thus, the crosstalk correction (interference removing processing) of removing double images of the telephoto image and the wide angle can be omitted. Even in this case, the crosstalk occurs because of a slight angular shift and the like between the polarizing filters PL1 and PL3 and the micropolarizers p1 and p3. Thus, it is preferable to perform the interference removing processing.

Figure 11A:
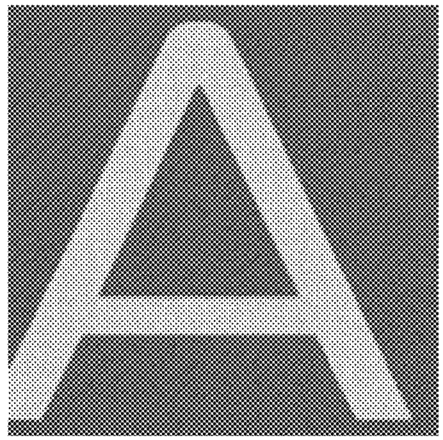
FIGS. 11A, 11B, and 11C are diagrams illustrating images without the crosstalk captured by the pupil-splitting multi-focus camera and an image in a case where the crosstalk occurs.
Figure 11B:
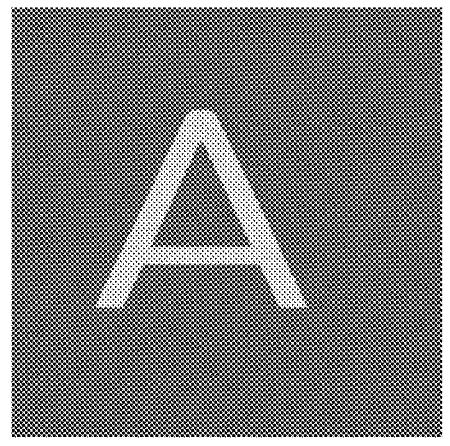
Figure 11C:
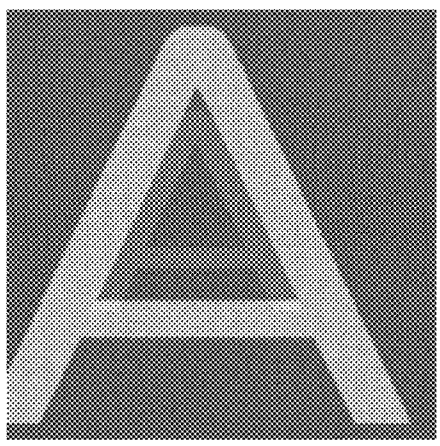

FIGS. 11A, 11B, and 11C are diagrams illustrating images without the crosstalk captured by the pupil-splitting multi-focus camera and an image in a case where the crosstalk occurs.

FIGS. 11A and 11B illustrate the telephoto image and the wide angle image, respectively, without the crosstalk. In FIG. 11C illustrates an image (telephoto image) in a case where the crosstalk that causes the wide angle image to be reflected in the telephoto image occurs.

The information processing apparatus 2 illustrated in FIG. 1 and FIG. 4 can also be applied to a case where the imaging apparatus of the pupil-splitting multi-focus camera is used instead of the imaging apparatus 1 of the multispectral camera.

That is, the processor 100 of the information processing apparatus 2 acquires at least two first images (the telephoto image and the wide angle image) captured under the first imaging condition and at least two second images (the telephoto image and the wide angle image) captured under the second imaging condition by changing the imaging condition.

The processor 100 can detect the crosstalk included in the telephoto image (the first image and the second image) based on the correlation between the feature amounts of the first image (telephoto image) and the second image (telephoto image) having the same focal length and can also detect the crosstalk included in the wide angle image (the first image and the second image) based on the correlation between the feature amounts of the first image (wide angle image) and the second image (wide angle image) having the same focal length.

Detection of the crosstalk can be performed in the same manner as that in the case of the multispectral camera and thus, will not be described in detail.

Figure 12A:
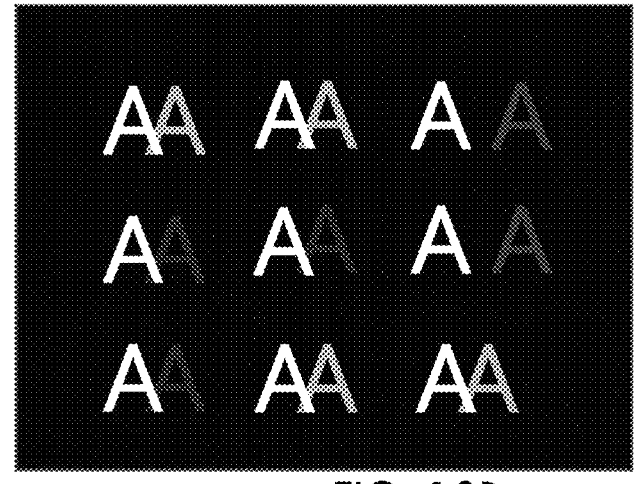
FIGS. 12A, 12B, and 12C are image diagrams of an image with multiple images, a multiple image map, and an image obtained by superimposing the multiple image map on the image with the multiple images.
Figure 12B:
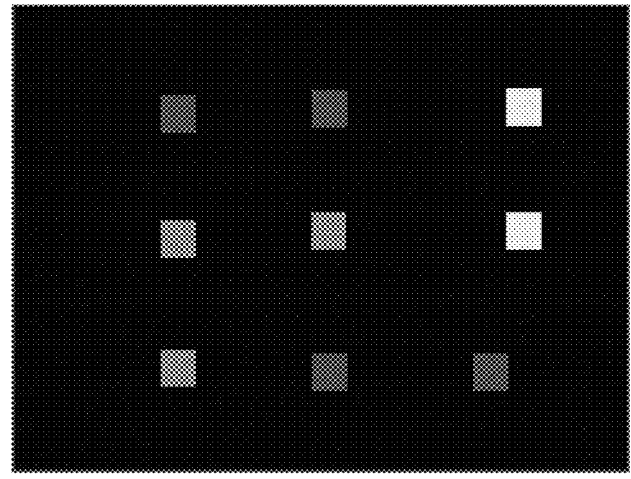
Figure 12B:
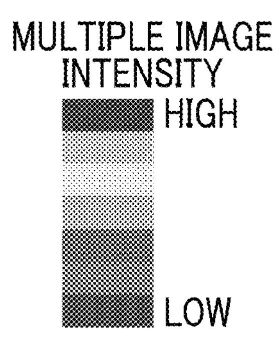
Figure 12C:
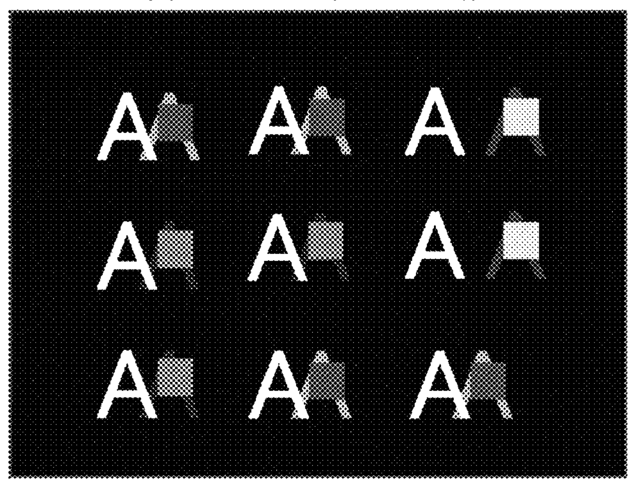
Figure 12C:
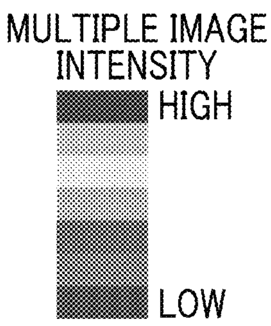

FIGS. 12A, 12B, and 12C are image diagrams of an image with the multiple images, a multiple image map, and an image obtained by superimposing the multiple image map on the image with the multiple images.

FIG. 12A is a diagram illustrating an example of the image with the multiple images.

The processor 100 acquires the first image and the second image of different imaging conditions corresponding to the image with the multiple images illustrated in FIG. 12A and, as described above, detects multiple image intensities that are intensities of light quantities (multiple images) reflected by the crosstalk from the autocorrelation coefficients of the first image and the second image.

The multiple image intensities, for example, can be obtained using the peak value and a magnitude of the peak P1 of the autocorrelation coefficient detected with respect to the image reflected by the crosstalk as illustrated in FIG. 6.

The processor 100 generates a multiple image map by obtaining the multiple image intensities and a position in a divided region in which the peak P1 occurs, for each divided region obtained by dividing the image into a plurality of parts (for example, in the example in FIGS. 12A to 12C, dividing into nine parts) as illustrated in FIG. 12B. In the multiple image map of the present example, a rectangle indicates the position of the multiple images in the divided region, and density of the rectangle indicates the multiple image intensities.

As illustrated in FIG. 12C, the processor 100 generates the image obtained by superimposing the multiple image map illustrated in FIG. 12B on the image with the multiple images illustrated in FIG. 12A. The processor 100 can display the generated multiple image map or the generated image obtained by superimposing the multiple image map on the image with the multiple images on the display 120. That is, the processor 100 can display information indicating whether or not the crosstalk is present or the intensity of the crosstalk for each of a plurality of locations in the image on the display 120 in a superimposed manner on the image with the multiple images.

According to this, in a case where the interference removing parameters (C11 to C33) in [Expression 2] are set for each divided region obtained by dividing the image into nine parts, which divided region the interference removing parameters (C11 to C33) are to be corrected for is perceived.

Embodiment of Information Processing Method

Figure 13:
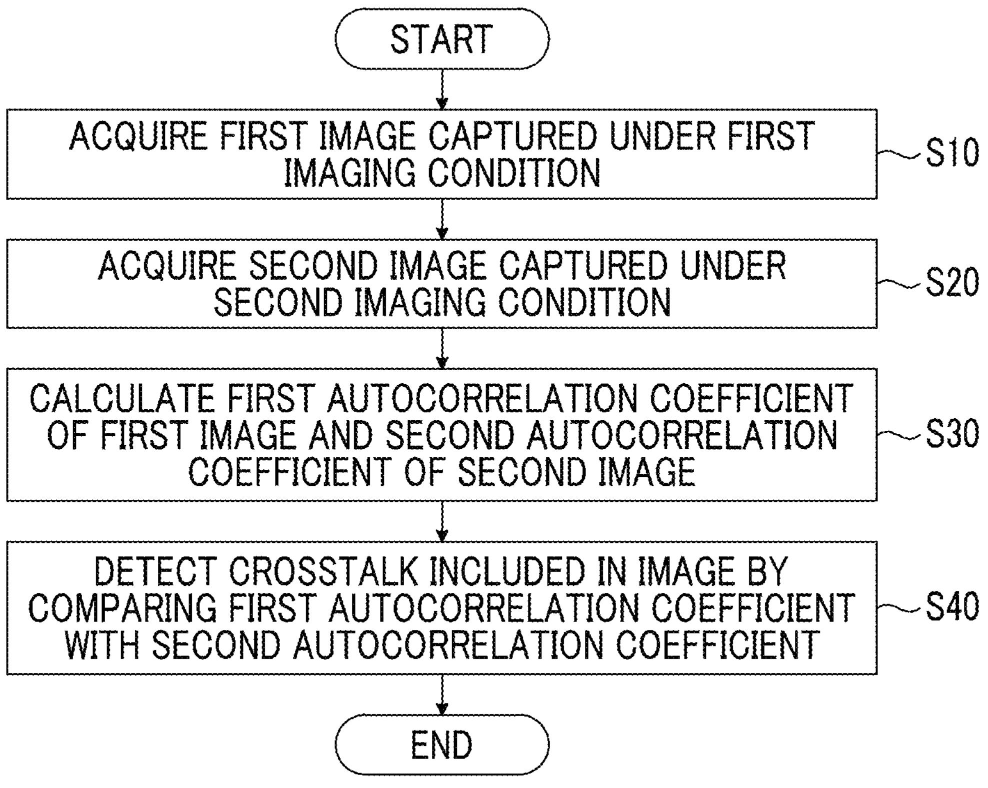
FIG. 13 is a flowchart illustrating an embodiment of an information processing method according to the embodiment of the present invention.

FIG. 13 is a flowchart illustrating an embodiment of an information processing method according to the embodiment of the present invention.

The processor 100 illustrated in FIG. 4 executes processing of each step illustrated in the flowchart in FIG. 13 in accordance with the information processing program.

In FIG. 13, the processor 100 acquires the first image captured under the first imaging condition and the second image captured under the second imaging condition as a target for the information processing, through the input-output interface 130 based on the operation input provided using the operating part 140 (step S10 and step S20).

The processor 100 detects the crosstalk included in the image based on the correlation between the feature amounts of the first image and the second image (step S30 and step S40).

In the present example, the processor 100 calculates the autocorrelation coefficient (first autocorrelation coefficient) of the first image and the autocorrelation coefficient (second autocorrelation coefficient) of the second image (step S30).

Next, the processor 100 compares the first autocorrelation coefficient with the second autocorrelation coefficient and detects the crosstalk included in the image (the first image and the second image) from a difference between the peak position or the peak values of the first autocorrelation coefficient and the second autocorrelation coefficient (step S40).

In a case where the first image and the second image are multispectral images of different imaging conditions captured by the multispectral camera, the first autocorrelation coefficient of the first image and the second autocorrelation coefficient of the second image having the same wavelength range are compared to detect the crosstalk in the image of the wavelength range.

Accordingly, in a case where a multispectral image is obtained for each of the three wavelength ranges, the crosstalk can be detected for each image of each wavelength range.

Other

While the information processing apparatus 2 of the present embodiment is an apparatus separated from the imaging apparatus 1, an apparatus in which the imaging apparatus 1 and the information processing apparatus 2 are integrated, that is, the imaging apparatus 1 comprising the information processing apparatus 2, may be used in the present invention.

In addition, while the filter unit 20 of the present example has three circular opening regions at equal intervals as the opening region allowing transmission of light of transmission wavelength ranges different from each other, the shape and the number of opening regions are not limited thereto. For example, a circular pupil region may have opening regions of four circular sectors having a central angle of 90° or opening regions of three circular sectors having a central angle of 120°.

In addition, in the present embodiment, for example, a hardware structure of a processing unit, such as the processor 100 of the information processing apparatus 2, that executes various types of processing corresponds to various processors illustrated as follows. The various processors include a central processing unit (CPU) that is a general-purpose processor functioning as various processing units by executing software (program), a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like.

One processing unit may be composed of one of the various processors or may be composed of two or more processors of the same type or different types (for example, a plurality of FPGAs or a combination of a CPU and an FPGA). In addition, a plurality of processing units may be composed of one processor. As an example of a plurality of processing units composed of one processor, first, as represented by a computer such as a client and a server, a form in which one processor is composed of a combination of one or more CPUs and software and the processor functions as a plurality of processing units is possible. Second, as represented by a system on chip (SoC) and the like, a form of using a processor that implements functions of the entire system including a plurality processing units in one integrated circuit (IC) chip is possible. Accordingly, various processing units are configured using one or more of the various processors as a hardware structure.

Furthermore, the hardware structure of the various processors is more specifically an electric circuit (circuitry) in which circuit elements such as semiconductor elements are combined.

In addition, the present invention includes the information processing program that is installed on a computer to cause the computer to function as the information processing apparatus according to the embodiment of the present invention and a non-volatile storage medium in which the information processing program is recorded.

Furthermore, the present invention is not limited to the above embodiment, and various modifications, of course, can be made without departing from the spirit of the present invention.

EXPLANATION OF REFERENCES

1: imaging apparatus
2: information processing apparatus
10: imaging optical system
10A: front group lens
10B: rear group lens
12: imaging optical system
12A, 12B, 12C: lens
20: filter unit
22: polarizing filter unit
30: image sensor
100: processor
110: memory
120: display
130: input-output interface
140: operating part
F: basic arrangement pattern
p1, p2, p3, p4: micropolarizer
P0, P1, P2, P3: peak
PL1, PL2, PL3: polarizing filter
S10, S20, S30, S40: step

What is claimed is:

1. An information processing apparatus comprising:

a processor configured to process images output from an image sensor of an imaging apparatus that captures images having a plurality of different characteristics by splitting a pupil, wherein the processor is configured to:

acquire a first image that is captured by the imaging apparatus with respect to a first subject under a first imaging condition, that is output from the image sensor and that has a characteristics among the plurality of different characteristics;

acquire a second image that is captured by the imaging apparatus with respect to the first subject under a second imaging condition different from the first imaging condition and that has the characteristic of the first image among the images output from the image sensor; and detect crosstalk included in the images based on a correlation between feature amounts of the first image and the second image, wherein the crosstalk is image components of different wavelengths included in the images.

2. The information processing apparatus according to claim 1, wherein the second imaging condition is an imaging condition for changing the feature amounts in a case where the crosstalk occurs.

3. The information processing apparatus according to claim 1, wherein the second imaging condition is an imaging condition in which at least one of a focus position, an imaging magnification, an illumination condition for a subject, or a relative position between the subject and the imaging apparatus is different with respect to the first imaging condition.

4. The information processing apparatus according to claim 1, wherein the processor is configured to:

acquire a plurality of the first images of the different wavelengths that are captured by the imaging apparatus under the first imaging condition and that are output from the image sensor;

acquire a plurality of the second images of the different wavelengths that are captured by the imaging apparatus under the second imaging condition and that are output from the image sensor; and detect the crosstalk included in the images based on a correlation between the plurality of first images and the plurality of second images.

5. The information processing apparatus according to claim 4, wherein the correlation is a relative value between positions and/or intensities of image components of the different wavelengths included in the first image and positions and/or intensities of image components of the different wavelengths included in the second image.

6. The information processing apparatus according to claim 1, wherein the correlation between the feature amounts of the first image and the second image is a correlation between peak positions or peak values of autocorrelation coefficients of the first image and the second image.

7. The information processing apparatus according to claim 1, wherein the second imaging condition is an imaging condition for outputting a reference image without the crosstalk from the image sensor as the second image, and the correlation between the feature amounts of the first image and the second image is a cross-correlation coefficient that is a cross-correlation coefficient between the first image and the reference image and that is obtained in a case where the first image and the reference image are relatively shifted.

8. The information processing apparatus according to claim 7, wherein the imaging apparatus includes an imaging optical system having a plurality of regions having characteristics different from each other, and the second imaging condition for outputting the reference image is an imaging condition for opening only one region of the plurality of regions and shielding other regions from light.

9. The information processing apparatus according to claim 7, wherein the imaging apparatus includes an imaging optical system having a plurality of regions that allow transmission of light having wavelength ranges different from each other, and the second imaging condition for outputting the reference image is an imaging condition for causing only light of one wavelength range among the light having wavelength ranges different from each other to be incident on the imaging optical system.

10. The information processing apparatus according to claim 1, wherein the second imaging condition is an imaging condition for outputting a reference image without the crosstalk from the image sensor as the second image, and the feature amounts of the first image and the second image are a degree of matching between feature points of the first image and the reference image.

11. The information processing apparatus according to claim 1, wherein the second imaging condition is an imaging condition for outputting a reference image without the crosstalk from the image sensor as the second image, and the feature amounts of the first image and the second image are a degree of matching between a plurality of divided images obtained by dividing each of the first image and the reference image into a lattice form.

12. The information processing apparatus according to claim 1, wherein the processor is configured to detect the crosstalk for each of a plurality of locations based on the correlation between the feature amounts of the first image and the second image for each of the plurality of locations.

13. The information processing apparatus according to claim 12, wherein the processor is configured to display information indicating whether or not the crosstalk is present or an intensity of the crosstalk for each of the plurality of locations on a display in a superimposed manner on the images output from the image sensor.

14. The information processing apparatus according to claim 1, wherein the processor is configured to perform interference removing processing of reducing the crosstalk among the images output from the image sensor, and each of the first image and the second image is an image that has been subjected to the interference removing processing.

15. An imaging apparatus comprising:

an imaging optical system in which an optical element including a plurality of wavelength-selective elements which respectively transmit lights having wavelength ranges different from each other for each of a plurality of regions is disposed at a pupil position or near the pupil position;

an image sensor that receives subject light for each of the plurality of wavelength ranges transmitted through each of the plurality of wavelength-selective elements by splitting a pupil; and the information processing apparatus according to claim 1.

16. The imaging apparatus according to claim 15, further comprising:

a plurality of first polarizing filters that are disposed to correspond to the plurality of regions and that have polarizing directions different from each other; and a plurality of second polarizing filters that are disposed in each pixel of the image sensor and that correspond to the plurality of first polarizing filters, respectively, wherein the plurality of first polarizing filters and the plurality of second polarizing filters cause the subject light transmitted through the plurality of regions to be incident on the image sensor by splitting the pupil for each region.

17. An imaging apparatus comprising:

a multi-focus imaging optical system having focal lengths different from each other for each of a plurality of regions;

an image sensor that receives subject light transmitted through each of the plurality of regions of the imaging optical system by splitting a pupil; and the information processing apparatus according to claim 1.

18. An information processing method of processing images output from an image sensor of an imaging apparatus that captures images having a plurality of different characteristics by splitting a pupil, the information processing method comprising:

a step of acquiring a first image that is captured by the imaging apparatus with respect to a first subject under a first imaging condition, that is output from the image sensor and that has a characteristics among the plurality of different characteristics;

a step of acquiring a second image that is captured by the imaging apparatus with respect to the first subject under a second imaging condition different from the first imaging condition and that has the characteristic of the first image among the images output from the image sensor; and a step of detecting crosstalk included in the images based on a correlation between feature amounts of the first image and the second image, wherein the crosstalk is image components of different wavelengths included in the images, wherein a processor is configured to execute processing of each step.

19. The information processing method according to claim 18, further comprising:

a step of performing interference removing processing of reducing the crosstalk included in the images output from the image sensor, wherein each of the first image and the second image is an image that has been subjected to the interference removing processing.

20. A non-transitory, computer readable tangible recording medium in which a program for causing, when read by a computer, the computer to execute the information processing method according to claim 18 is recorded.

* * * * *